United States Patent [19]

Cornil

[11] Patent Number: 4,966,307
[45] Date of Patent: Oct. 30, 1990

[54] INTEGRATED MULTIFUNCTION REGULATOR STATION FOR GAS SUPPLY TO A SECONDARY MAINS

[75] Inventor: Jean-Philippe Cornil, Houilles, France

[73] Assignee: Gaz de France, Paris, France

[21] Appl. No.: 334,693

[22] Filed: Apr. 5, 1989

[30] Foreign Application Priority Data

Apr. 14, 1988 [FR] France .................. 88 04961

[51] Int. Cl.[5] .............................................. B67B 7/24
[52] U.S. Cl. ....................................... 222/3; 73/199; 137/494
[58] Field of Search ............................ 222/3, 71, 189; 137/494; 73/199

[56] References Cited

U.S. PATENT DOCUMENTS 2,387,805  10/1945  Olsen ........................................ 73/199
3,815,627   6/1974  Farrell et al. .......................... 73/199

FOREIGN PATENT DOCUMENTS 565460  11/1958  Canada ................................... 73/199
2341131   8/1977  France .
127177    8/1982  Japan ..................................... 137/497
2024650   1/1980  United Kingdom .

Primary Examiner—H. Grant Skaggs
Attorney, Agent, or Firm—Ladas & Parry

[57] ABSTRACT

The integrated multifunction regulator station for gas supply to secondary user mains from a principal distribution mains, comprises a single external housing having an essentially cylindrical shape, designed to withstand the gas operating pressure, in which are contained active elements including at least a filter, a pressure regulator and a safety valve.

A flow meter and the pressure regulator are mounted on a traversal wall. The filter is formed from a cylindrical cartridge located between a removable bulkhead and the pressure regulator, which is itself mounted on the tranversal wall. The safety valve is mounted on the removable bulkhead and includes a safety valve head located upstream of the pressure regulator, at a to part of the latter, and inside the cylindrically shaped cartridge.

16 Claims, 8 Drawing Sheets

INTEGRATED MULTIFUNCTION REGULATOR STATION FOR GAS SUPPLY TO A SECONDARY MAINS

The present invention concerns an integrated multifunction regulator station for gas supply to a secondary mains network running off a principal distribution mains.

BACKGROUND OF THE INVENTION

The invention more specifically relates to a multifunction integrated regulator station comprising a single external housing designed so as to withstand an operating gas pressure and providing accommodation for at least a filter, a pressure regulator and a safety valve, said single external housing having an essentially cylindrical lateral wall, first and second bulkheads mounted on the frontal portions of the single external housing, a transversal separating and supporting wall lying substantially parallel to the first and second bulkheads and disposed inside the single housing to define first and second chambers, the single external housing being fitted with an entrance flange joined to an input valve and defining an input orifice which gives onto said first chamber, and an output flange joined to an output valve and defining an output orifice formed inside said second chamber.

A classical gas regulating metering station is connected to a principal gas distribution mains 1 to supply a secondary mains 7, which can be formed e.g. by a simple supply pipe to a gas appliance, is shown in FIG. 2. Such a regulating station essentially comprises an input valve 2, a filter 3, a safety valve 4, a pressure regulator 8 that generally shares a common housing with the safety valve 4, interconnection piping 9, a gas flow meter 5, and an output valve 6.

Each of these elements must conform to the mechanical requirements imposed by the operating pressure as well as the dimensional requirements determined by the station's throughput.

These elements are generally connected in series according to a fixed order and the proper functioning of some of them, like the meter 5, calls for interconnecting piping 9 that is sufficiently long to prevent all possible interaction between the various elements.

Taking all these factors into account results in regulator stations that are considerably bulky when constructed from known techniques.

It has been proposed in patent GB-A-2 024 650 to produce a regulating station comprising regulators, filters and a safety valve all axially aligned and contained within a single gas-tight enclosure. This configuration of axially aligned cascaded elements tends to result in a relatively tall enclosure. Moreover, the regulating station described in document GB-A-2 024 650 contains no metering or flow rate measuring means. The addition of a meter would there again imply the use of substantially long interconnecting piping. Indeed, the strong turbulence that occurs requires that the gas flow rate measuring device be located at a distance from the regulator corresponding to several times the diameter of the piping joining the two elements. This leads to considerable overall dimensions. Moreover, the piping connecting a pressure regulator to a meter such as a turbine meter generally introduces turbulences in addition to those produced by the regulator, owing to the specific profile of the connecting pipes and possible accessories mounted on them. The flowmeter can thus receive a gas flux whose speed profile is deformed or submitted to rotations in the gaseous flow, adversely affecting the metering accuracy.

It has also been proposed, notably in patent number FR-A-2 341 131 to produce an integrated regulating-metering unit that can both regulate a pressure and meter the flow through the unit. The integration of such a unit into a regulating station, while being considerably advantageous, nevertheless requires producing for each range of operating pressures, a unit whose body is adapted to that range of pressures. Besides, the juxtaposition of a filter, an integrated regulator-meter and a safety device within a regulating station necessarily involves implementing a succession of bulky elements each of which must be specifically dimensioned and adapted to the operating pressure.

Most of the known gas regulating stations also require the complete removal of the gas pipe line between the station's input and output valves. Uncoupling operations must therefore be carried on the various constituting elements, making assembling and dismantling operations long and awkward.

SUMMARY OF THE INVENTION

The aim of the present invention is to overcome these drawbacks and to provide more compact gas regulating stations whose construction and maintenance are simplified and whose design and operation have a more universal character compared to known regulating stations, and which furthermore provide a gas outflow metering function without affecting the station's compactness.

These aims are met thanks to a regulating station of a type defined at the beginning of this description and which, according to the invention, is characterized in that it further comprises a flow meter mounted on said transversal wall and that said filter is formed by a cylindrical cartridge located between the first bulkhead and the pressure regulator, which is itself mounted on said transversal wall, and in that the safety valve is mounted on the first bulkhead and contains a safety valvehead located upstream of the pressure regulator, at a top part of the latter and inside the cylindrically shaped cartridge.

According to a first embodiment of the present invention, the regulating station comprises an actuable regulator located substantially axially inside the external housing within said first chamber, with an output valvehead and an output valve seat defining an essentially radial gas outflow, a flow director located immediately downstream of the actuable regulator's output valvehead to redirect the gas flow along an axial direction, and a separate flow meter located immediately downstream of the flow director.

In this embodiment, the flow director comprises a perforated plate that also serves as a support for the valve seat of the actuable regulator, and an element formed of porous material located immediately downstream of the perforated plate.

The perforated plate comprises a set of holes whose cross-sections are of the order of 3 to 30 square millimeters and the total aperture of the holes in the perforated plate is equivalent to that of the regulator's output valve in the fully open position so that gas regulation occurs in stages between the regulator's output valve and the flow director.

Inside of the flow director the porous-material element offers a load loss of the same order as that of the perforated plate.

Advantageously, the porous-material element has a hemispherically-shaped concave output face.

The presence of an integrated flow director at the pressure regulator output thus enables the gas flow to be rearranged to pass from a radial direction to an axial direction and present a uniform speed profile at the output.

Having a flow director that contributes to the gas regulation, in contrast with known flow directors in which minimal load losses are sought, provides a stepwise regulation that limits the shock wave effect that occurs with sonic mode regulation.

The flow director also contributes significantly to the reduction of noise due to regulation.

The presence of a flow director integrated right at the regulator output also enables the insertion of a flow rate metering device, such as a turbine, right at the regulator output and thus obviates the need for piping between the regulator and the meter, so avoiding all the above-mentioned drawbacks resulting from the presence of such piping.

According to a specific characteristic, to facilitate the change of the meter's calibre and thus to better adapt the latter to optimal flow conditions in the installation, the flow meter is contained inside a movable cylindrical liner having a standardised external cross-section to engage inside a support cylinder of the flow meter mounted on said tranversal wall.

Advantageously, the integrated regulating station according to the invention further comprises an actuable device, for selectively introducing a load loss, located in the second chamber between the flow meter and the output orifice, to introduce a load loss that reacts to the speed of the gas travelling inside the flow meter in order to increase the meter's dynamic.

In this case, the regulating station can include an electronic correction device to which are applied data signals respectively supplied by a flow detector associated to the flow meter, a pressure sensor in the second chamber and a temperature sensor in the second chamber. The electronic correction device contains means for determining the true flow corrected in function of the measured flow, pressure, temperature, and the gas compressibility coefficient, means for comparing said true corrected flow with a stored threshold value corresponding to a maximum allowed flow for the flow meter, and means for only authorising the activation of a pneumatic actuator acting on the actuable device for selectively introducing a load loss when the true corrected flow rate exceeds the maximum stored threshold value.

According to a second embodiment, the regulating station includes a differential pneumatic device that continuously measures the meter's natural load loss, compares it with a reference load loss corresponding to the maximum allowed flow and activates the actuable device for selectively introducing a load loss when the measured load loss exceeds the reference load loss.

According to a second embodiment of the present invention the multifunction integrated regulating station includes an integrated regulator-meter at a reference pressure and fitted with a nozzle defining, with an ogival valvehead, a neck of variable cross-section in which the flow is parallel to the axis of the single housing.

Advantageously, the regulating station further includes an actuable device for selectively reducing the pressure, located in the first chamber inside the cylindrical shaped filter between the safety valvehead and the integrated regulator-counter, in order to increase the dynamic of the latter.

In this case the regulating station includes a flow calculator into which are fed the signals corresponding to the operating parameters of the integrated regulator-meter and which continuously monitors the neck opening of the integrated regulator monitor so as to only allow the activation of the pneumatic control device for selective pressure reduction when the neck opening has fallen below a predetermined threshold value.

The regulating station according to the invention is adapted to various control systems.

Thus, in the embodiment implementing an integrated regulator meter, the regulating station advantageously includes at least one sensor for measuring the regulator-meter control pressure, a pressure sensor downstream of the gas, a pressure sensor upstream of the gas, a temperature sensor upstream of the gas, and a sensor determining the relative positions of the elements forming the nozzle having a variable cross-section neck, and a calculator having on the one hand means for determining the gas flow across the regulator-meter on the basis of data supplied by the upstream pressure sensor, upstream temperature sensor and sensor measuring the relative positions of the elements defining the nozzle having a variable cross-section neck, and on the other hand second means controlling the activation of the safety valve as a function of the calculated flow value obtained by the first means and data supplied by the downstream pressure sensors and the control pressure.

BRIEF DESCRIPTION OF THE DRAWINGS

Other characteristics and advantages of the present invention will come to light in the following description of specific embodiments with reference to the appended figures in which.

MORE DETAILED DESCRIPTION

Figure 2:
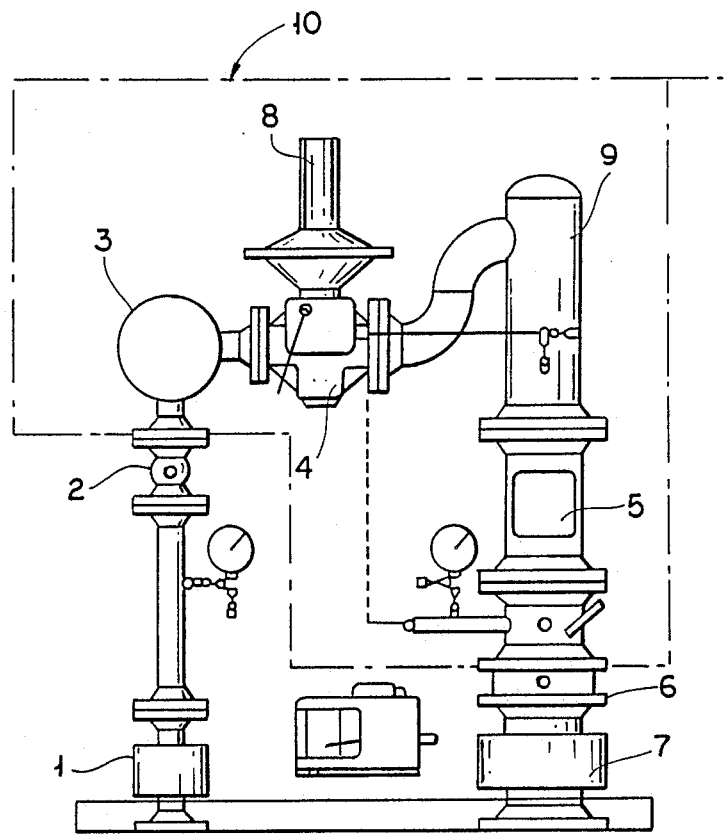
FIG. 2 is a plan view of a classical regulating station.

If we go back to FIG. 2, which illustrates a classical regulator station, it can be seen that the part 10 formed by the elements connected in series between the input valve 2 and the output valve 6 is very bulky and forms a series assembly of a succession of elements 3, 4, 8, 9 and 5 which should each be designed so as to withstand the operating pressure. Thus, each constituting element should have an external housing which should be designed and controlled so as to be able to resist to a relatively high pressure. The repetition of these controls is obviously a drawback.

Besides, the implementation of a regulator, such as regulator 8, creates gas fronts travelling downstream at a non-uniform speed. In order to return to a uniform speed distribution at the input of a separate flow meter, such as meter 5, there must be provided linking elements 9 of sufficient length between the regulator 8 and the meter 5. Classical regulator and metering stations thus remain bulky and expensive, not to mention maintenance difficulties they bring insofar as the replacement, checking, or recalibration of one of the elements forming the sub-assembly 10 calls for a line disconnection. The integrated multifunction regulator station shown in FIG. 1 allows the use of standard regulating and metering elements while facilitating the assembly and dismantling for maintenance purposes and greatly increasing the compactness of the assembly.

Figure 1:
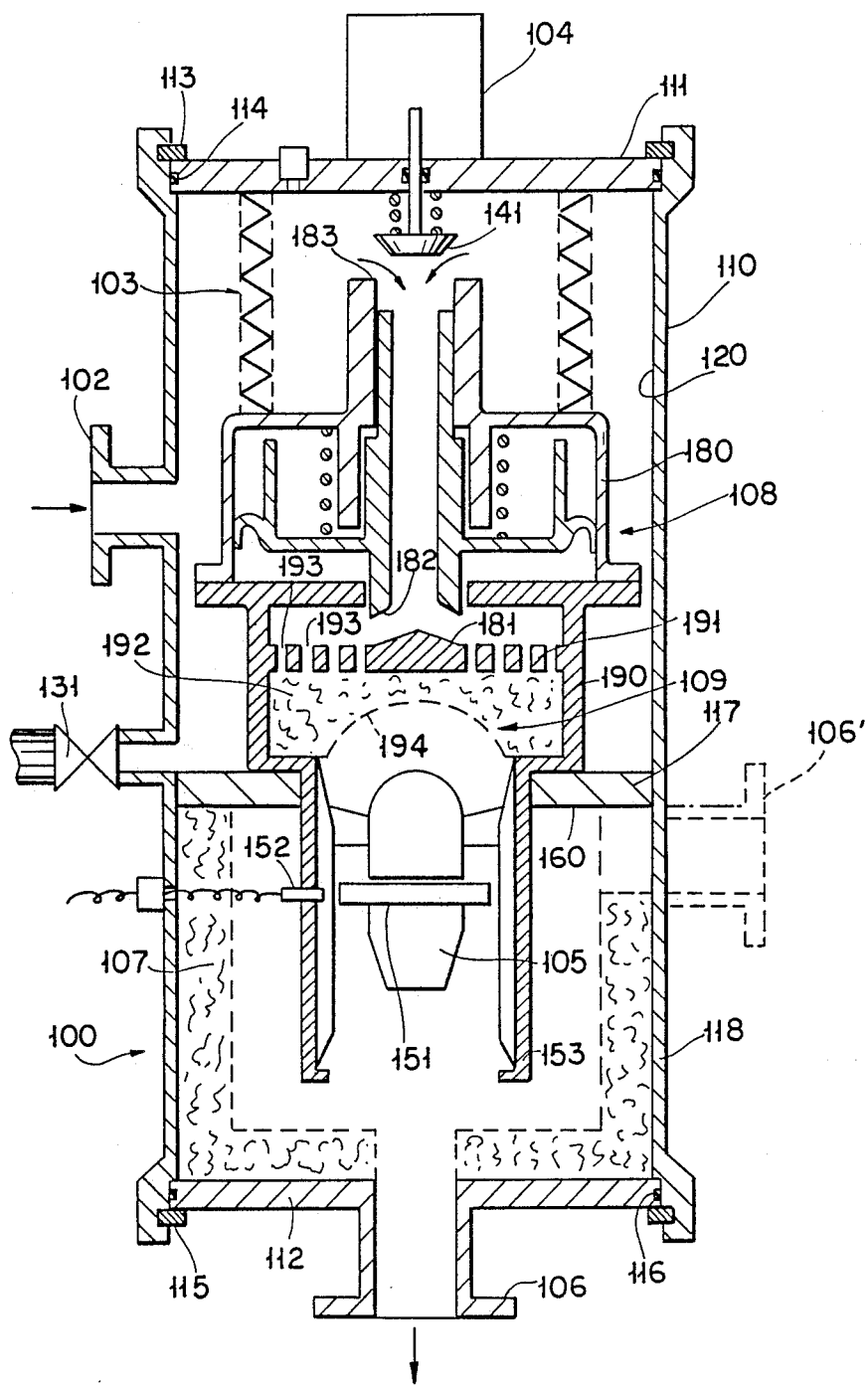
FIG. 1 is an axial cross-sectional view of an integrated multifunction regulator station according to a first embodiment of the present invention, in which the controlled regulator and the flow meter are separate.

The regulator station 100 shown in FIG. 1 corresponds to the sub-assembly 10 shown in FIG. 2 and connects both to the input valve 2 and the output valve 6. The regulator station 100 has an external housing 110 which forms an envelope capable of withstanding the operating pressure and essentially contains a lateral wall 118 having an approximately cylindrical shape and which can correspond, for example, to the lateral wall of a classical filter. The front faces of the housing 110 are closed by first and second bulkheads 111, 112 which are joined in a gas tight manner via joints 114, 116 at the ends of the lateral wall 118 and are locked by locking elements 113, 115 which can easily be removed to allow for the withdrawal of the removable bulkheads 111, 112 for access inside the housing 110 during the removal of one of the active elements inside that housing 110.

A separating wall 117, substantially parallel to the end bulkheads 111, 112, is affixed to the lateral wall 118 of the housing 110, inside the latter, to define two separate chambers 120, 160.

A flange serving to connect the input valve 2 is joined to the lateral wall 118 of the housing 110 to define an input orifice 102 in the upper chamber 120 of the regulator station. A flange for connection to an output valve 6 is likewise formed in the lower bulkhead 112 of the housing 110 to define an output orifice 106 that communicates with the second chamber 160, in the case where the output orifice is be placed at right angles to the input orifice 102. Alternatively, the output orifice 106' can be formed on the lateral wall 118 of the housing 110 so as to communicate with the lower chamber 160 and define input 102 and output 106' orifices (shown in dotted lines on FIG. 1).

A standard actuable regulator 108 is affixed to the separating wall 117 of the first chamber 120 and has an input 183 forming a valve seat which cooperates with a safety valvehead 141, forming part of the safety valve assembly 104 affixed to the upper movable bulkhead 111. The actuable regulator 108 can have a completely classical design with an output valvehead 182, but, because it is balanced in pressure owing to the presence of the external housing 110 there is no need for the regulator 108 itself to have a housing 180 physically capable of withstanding pressure. The regulator 108 can therefore be of much simpler design and have a reduced volume.

The cylindrically shaped filtering cartridge 103 is located between the regulator 108 and the upper bulkhead 111 which bears the safety valve 104. A bleeder valve 131 for the filter 103 is located in the lateral wall 118 of the housing 110 at the level of the separating wall 117. The valvehead 141 of the safety valve 104 and the valvehead seating 183 are located in the free space provided inside the filtering cartridge 103, increasing the compactness of the assembly. By being located immediately below the movable bulkhead 111, the filter 103 can moreover easily be changed without having to remove the other elements inside the regulator station.

The regulator 108, which is located substantially axially inside the housing 110 is followed by a flow director 109 formed by a perforated plate 191 which contributes to dividing the flow, and an element 192 which can be formed of a porous material. The flow director 109 serves to rearrange, at the counter 105 input, the gas velocity profile disturbed by the proximity of the regulator's valvehead 182. This flow director 109 also contributes to reducing the noise caused by the regulating process.

Figure 3:
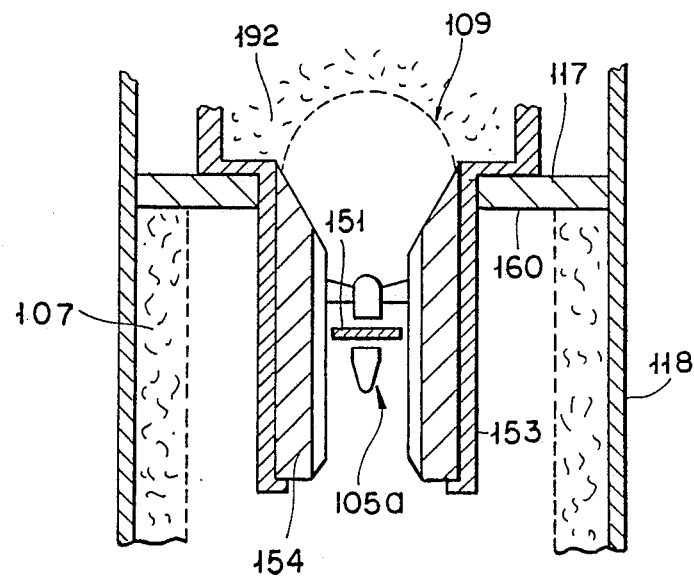
FIG. 3 is a partial view of an axial cross-section of a variant on the embodiment shown in FIG. 1, in which the flow meter is located inside an adaptor liner.

The gas flow meter 105 is located within the housing 110, axially downstream of the regulator 108 and the flow regulator 109, and crosses the separating wall 117 to project inside the second chamber 160. The counter 105 can be of the turbine type, as shown in FIG. 1, having blades 151 the detection of which is ensured by a blade detector 152 located on a vertical wall 153 joined to the separating wall 117 and defining a flow conduit which is axial with the housing 110. The meter 105 can, however, incorporate another type of flow measuring element such as a vortex generator, or another system used in standard meters. It shall be noted that the flow meter 105 operates under uniform pressure, like the regulator 108, by virtue of the external housing 110 and it is therefore no longer necessary to house the meter's measuring elements in a specific housing capable of withstanding the operating pressure. Considering that the weight of the housing of a classical high-pressure turbine meter can represent around twenty times the weight of the measuring element itself, which is usually made of plastics material, the possibility of mounting the meter's 105 measuring elements directly on the separating wall 117 without recourse to a special pressure resistant housing for the meter other than the external housing 110 of the regulating station, a considerable weight saving is achieved. In order to adapt the measuring element's 105 calibre to the operating conditions, it is possible to install a movable cylindrical liner 154 having a standardised external cross-section adapted to engage inside the cylinder 153 (FIG. 3). A measuring element proper 105A having a smaller calibre can thus be placed inside the movable liner 154, allowing adaptation to the optimum flow conditions without having to modify the other regulator station elements.

In operation, the regulator station 100 receives, via its input orifice 102, the gaseous fluid at upstream pressure, which penetrates into the upper chamber 120. The gas travelling through the input orifice first meets the filtering cartridge 103, then the safety diaphragm 141 located inside the cartridge 103 and then penetrates inside the regulator 108 located in the upper chamber 120. After regulation and passage through the flow director 109, the gas then travels through the meter 105 and enters the lower chamber 160 which is itself arranged so as to form a passive type silencer 107, which is formed of sound absorbing material applied to the lower chamber walls and serving to reduce the noise generated by the regulating process. The gas then exits through the output orifice 106 or 106′, to return to the distribution mains.

It can be noted that within the housing 110 are integrated all the regulator station functions, that is: filtering, safety protection, regulation, metering and noise reduction, whereas these different functions were previously carried out by distributed sub-assemblies connected in series.

The advantages which result from the implementation of an integrated regulator station of a type described in FIG. 1 are as follows only the external housing 110 of the module 100 is subjected to the operating pressure and needs to be submitted for approval, while the internal constituent elements operate under virtually uniform pressure and can thus be of simplified design, free of housings having to resist the operating pressure.

The assembly's 100 modular design simplifies maintenance since the opening provided by the upper bulkhead 111 gives direct access to the safety valvehead 141, the filter cartridge 103 for replacement, and to the regulator assembly 108, the flow director 109 and the meter 105 which can be removed for maintenance or for replacing a membrane, say, or again for periodic recalibration, all without line disconnection.

As can be seen in the embodiment of FIG. 1, the presence of an adapted flow regulator 109 enables all interconnection piping between the regulator 108 and the meter 105 to be dispensed with, and thus radically increases the assembly's compactness, while ensuring a uniform velocity fields for the gas flow at input to the flow meter input, whose operating principle is based on a flow speed measurement.

Various studies on turbulent flow have shown that to obtain the ideal flow conditions in which the velocity distribution is invariable from one normal plane to another, there should be provided linear conduits of considerable length. It has already been proposed, notably in a paper by Messrs. Gajan, Hibrard, Bosch and Lejan, submitted at the 1988 ATG Congress on gas, and entitled "a Flow Regulator for Flow Metering by Diaphragm that Dispenses with Installation Conditions", to produce a flow regulator enabling a reduction in the length of the linear conduit required to obtain a uniform velocity field. This type of regulator, which is specifically designed for diaphragm metering techniques and offers a very low load loss, turns out, however, to have a greatly reduced efficiency if simply placed in juxtaposition at a regulator output.

According to the present invention, the flow director 109 has a specific design and is in fact located inside a part 190 of the body 180, 190 of the reguator 108 thus enabling it to cooperate intimately with the latter.

Thus, as can be seen in FIG. 1, the plate 191 having perforations 193 also serves as a support for the valve 181 seat of the regulator 108.

The essentially radial gas flow between the regulator's 108 output valvehead 182 and the valve seat 181 having a conical shape, is rearranged along an axial direction inside a narrow space and passes from a sonic speed at the valve level to a speed of a few meters per second at the plate 191 exit. The jet effects, which are detrimental to turbine meters, are eliminated since, in exiting from the valvehead 182, the gas jet, which is directed to the regulator's 108 internal wall 190 loses a large part of its kinetic energy which is transformed into pressure.

The specific location of the flow director 109 sidesteps the problem linked with the director's load loss. Indeed, the flow director dimensions contribute to the gas regulation i.e. its useful aperture corresponds to that of regulator valvehead 182 when fully open.

For example, if the regulator valve 182—which is upstream of flow director 109—presents a flow cross-section corresponding to a 50 mm diameter orifice when fully open, the flow director 109 should present a flow cross-section equivalent to this 50 mm diameter orifice.

This condition allows a decompression in stages between the regulator valvehead 182 and the flow director 109 due to the fact that any increase in flow drawn by the mains will result in a pressure increase upstream of the flow director 109, the latter then tending towards the pressure value at the regulator 108 input when said regulator valvehead 182 is in the fully open position. In this latter condition the complete pressure regulation will be carried out by the flow director 109, which thus effectively contributes to pressure regulation.

As already explained, the flow regulator 109 has a plate 191 at the centre of which is located the seat for the regulator 108 valvehead 181.

This plate 191 is perforated with numerous cylindrical orifices 193 forming a crown configuration around the regulator seat 181. Their number n is a function of the passage cross-section of the valve 182 and corresponds to the ratio S/s in which:

S is the section of the passage of regulator valvehead 182 when fully open, s is the passage cross-section of an orifice 193 in the plate 191.

The diameter of each orifice can be approximately between 2 and 6 mm, it being understood that efficiency is maximum with the smallest orifices.

Downstream of this perforated plate 191 is located a porous material 192 which can be for example frittered metal (such as frittered bronze), which offers the advantage of good mechanical resistance.

The frittered metal can however be replaced by any other material so long as the porosity remains the same. Likewise, the space between the plate 191 and the hemispherical grid 194 supporting the porous material and located at the regulator output, can be filled with various fibrous materials, as long as their cohesion grants the required degree of mechanical strength and porosity. For example the element 192 can be made from a glass fibre fabric.

The load loss of the porous material 192 used is of the same order of that of the perforated plate 191 located upstream.

The hemispherically shaped output grid 194 allows a distribution of the regulator's load losses, these being maximum near the outside and minimum at the centre. This shape enhances gas flow in the region located immediately downstream of a valvehead 182.

Finally the use of a porous material 192 in the flow director 109 also contributes toward regulator noise attenuation in addition to its role of speed stabilization and homogenisation.

The present invention also allows the meter's dynamic to be easily increased compared with existing devices.

In the present state of the art, the intrinsic dynamic of classical flow meters or industrial meters is of around 20. This figure corresponds to the ratio of a maximum flow to a minimum flow that can be accommodated with a pressure normalised to + or − 1%.

For example a meter capable of measuring a maximum flow of 1000 m$^3$/h with an accuracy of + or −1% should be able to measure a flow of 50 m$^3$/h with the same accuracy. Its dynamic is then:

$$\frac{1000}{50} = 20$$

To exploit this dynamic, it is imperative that the meter operates at constant pressure, which calls for it to be associated to a pressure regulator as is the case in the diagrams of FIGS. 1 and 2.

Such an arrangement produces a considerable risk of destroying the meter, owing to the use of oversized pressure regulators. Indeed, the latter must supply the meter's maximum flow when the network pressure is at its lowest. However the mains pressure is more often than not maintained at maximum pressure. In this case, the flow from the regulators is potentially very much greater than that from the associated meters.

For example: a customer requiring a flow of 100 cubic meters per hour uses a regulating metering station of a type shown in FIG. 1. Here, the regulator is chosen to pass this flow with a mains pressure of 1.6 bars absolute (the minimum pressure allowed in the Gaz de France medium-pressure mains), however, most of the time this regulator will be supplied with a pressure of 4.8 bars absolute (maximum operating pressure allowed in the Gaz de France medium-pressure mains), which thus multiplies the flow range by a factor of 3. Under these conditions, a meter set for a maximum flow of 100 cubic meters per hour could be accidently exposed to a flow of 300 cubic meters per hour from the regulator, which would naturally lead to its destruction.

Another solution that can also be considered consists in locating the meter upstream of the regulator, but this would reduce the overall dynamic of the regulating metering station by a factor equal to the variation coefficient of the gas mains pressure (4.8/1.6), insofar as the meter is designed to withstand the maximum possible pressure from the regulator.

Figure 4:
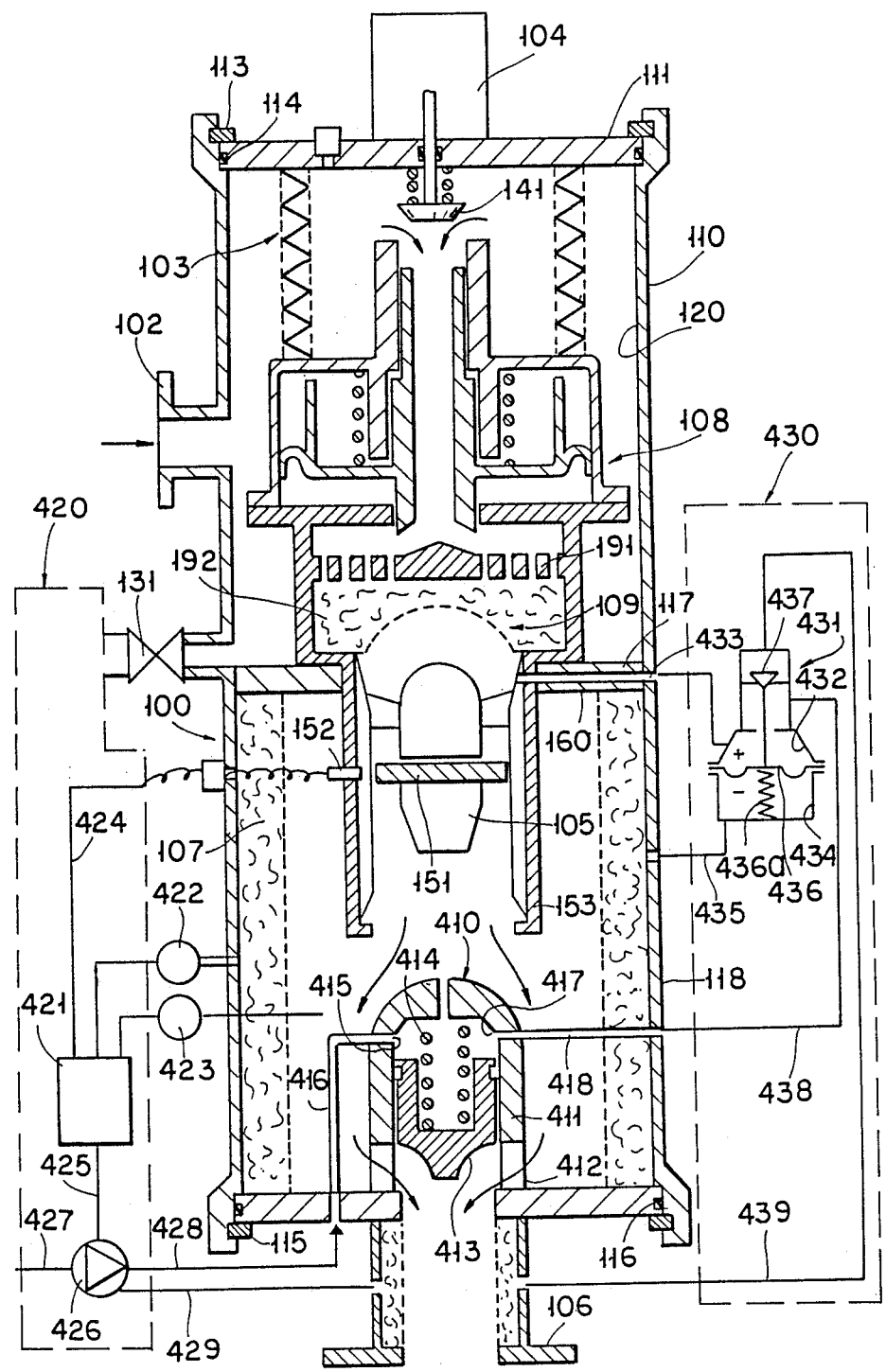
FIG. 4 is an axial cross-sectional view of a regulator station according to the embodiment of FIG. 1, further equipped with a controller device for selectively introducing a load loss downstream of the flow meter.

According to the present invention, it is possible, as shown in FIG. 4, to maintain the downstream location of the meter 105, associated with a regulator 108 and flow director 109 already described, while ensuring an increase in the meter's dynamic.

A device 410 comparable to a squeeze valve is placed immediately downstream of the meter 105. Its purpose is to introduce a load loss determined by the speed of the gas travelling inside the meter 105.

For a given flow rate, the increase in the load loss, produced by the controlled device 410 selectively introducing a load loss in the second chamber 160, raises the pressure at the level of the meter 105 and thus creates a load reduction that is proportional to speed.

Under these conditions everything takes place as if the meter 105 changed automatically from a constant-pressure operating mode (downstream position with respect to the regulator) to a variable-pressure operating mode (upstream position with respect to the regulator).

The controlled device 410 for creating a load loss between the meter 105 and the output orifice 106 comprises a body 411 containing a slidable element 413 forming a valvehead acted upon by a spring 414, and capable of changing the passage cross-section of the orifices 412 formed in the body 411 to allow gas flow to the output orifice 106.

The displacement of the valvehead 413 is caused by a control pressure applied by a pneumatic control device 420 resp 430 via a line 428, 416 resp 438, 418 giving onto orifices 415 resp 417 in the chamber formed by the housing 411 behind the diaphragm 413.

Control for the pneumatic device 410 creating selective load losses can be achieved from an electronic control device 420 or, alternatively, an entirely pneumatic differential device 430. Both variants to the embodiment are shown in FIG. 4, but clearly in practical situations only one of these control devices 420, 430 would be implemented.

The electronic control device 420 includes an electronic correction device 421 that receives data signals respectively from the flow meter 105 pulse generator 152, a pressure sensor 422 in the second chamber 160 and a temperature T sensor 423 in the second chamber 160. The electronic correction device 421 has means for determining: the true corrected flow as a function of the measured flow, gas pressure P, temperature T, and the gas compressibility coefficient Z, means for comparing the true corrected flow with a stored threshold value corresponding to the maximum allowed flow into the flow meter 105, and means for only allowing, via a line 425, the operation of a pneumatic actuator 426 acting on the actuable device 410 that selectively introduces a load loss, when the true corrected flow exceeds the stored threshold value. The pneumatic actuator 426 is fed by a supply line 427 and, upon receiving signals via line 425, delivers an activation pressure via lines 428, 416 to the device 410. A line 429 is provided for evacuation at the output orifice 106 downstream of the device 410.

Thus, in this arrangement, the flow corrector 421 compares the frequency data delivered by the meter's 105 pulse generator 152 with a stored value corresponding to the maximum allowed flow for that type of meter. All the while the measured frequency remains below the stored threshold value, the corrector 421 has no action on the actuator 426 of the controlling element 410 generating the load loss.

When the threshold is reached, the corrector 421 produces a signal on line 425 which activates the load loss generating element 410 via the actuator 426.

This action brings about a pressure increase at the meter 105 level and consequently reduces the flow rate and hence the frequency of the signal relating to that speed.

If the pneumatic pressure differential device 430 is used, the load loss generating device is then controlled from a differential device 431 that constantly measures the meter's 105 natural load loss. Under these conditions, all the while the meter's load loss remains below that corresponding to a maximum authorised flow rate, the device 431 has no action on the load loss generating device 410.

Otherwise, the pneumatic differential device 431 reacts and activates the load loss regulating device 410, which is identical to that described in the electronic variant.

The pneumatic differential device 431 can be of a classical design. A membrane 436 is held in tension by an elastic member 436a and separates the device into a first chamber 432 connected via a line 433 to a gas flow zone located between the flow director 109 and the meter 105, and a second chamber 434 connected via a line 435 to a gas flow zone located downstream of the meter 105. When the measured pressure differential remains below a predetermined threshold value, a valvehead 437, unitary with the membrane, remains open and allows pressure to escape from the other chamber via line 439 to the output orifice 106. Conversely, when the differential pressure exceeds the predetermined threshold, which is equal to the meter's load loss corresponding to a maximum allowed flow, the valvehead 437 is closed and allows a control pressure to bear via lines 438, 418 in order to activate the device 410.

By varying the pressure at the level of the meter 105, the solutions shown with reference to FIG. 4 provide the following set of advantages:

it is possible to use a meter having a smaller calibre, which enables smaller minimum flow rates to be measured and tends to increase the dynamic, a saving on the meter 105 is obtained owing to the change in calibre. Indeed, depending on the pressure variation amplitude of the gas supply mains to the regulating metering station, it is possible to reduce the calibres by a factor of between 2 and 4, which naturally increases the dynamic by the same factor i.e. to between 40 and 80, a better use is made of the possibilities offered by flow correctors 421 of the PTZ type, which mostly work with little pressure variation, the saving achieved by reducing the meter's 105 calibre compensates for the cost of the corrector 420. This is particularly true in the case of metering between a transport mains network and a distribution mains, risks of destroying the meters disappear since the device prevents overspeeds.

Figure 5:
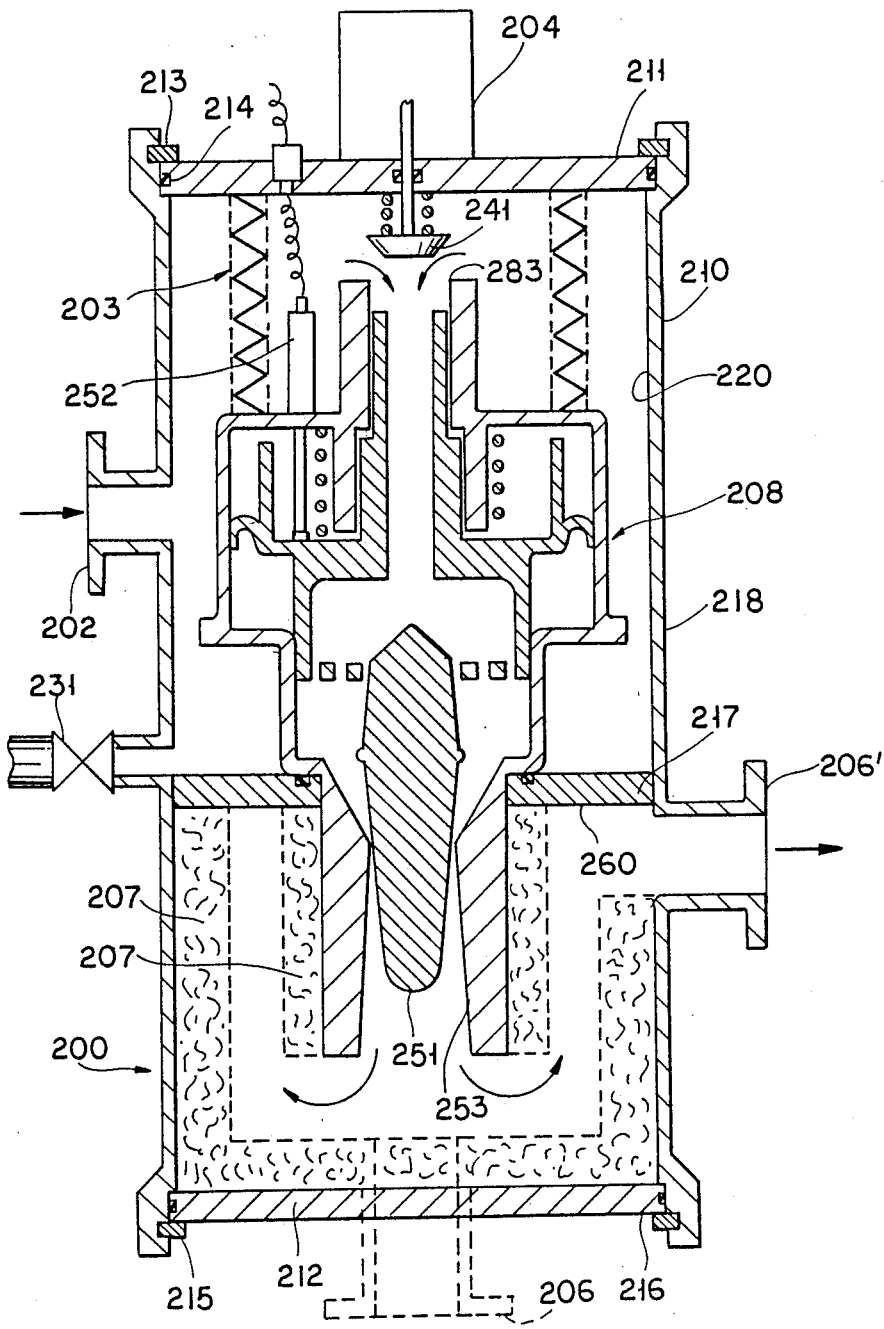
FIG. 5 is an axial cross-sectional view of an integrated multifunction regulator station according to a second embodiment of the present invention, in which is implemented an integrated regulator counter.
Figure 6:
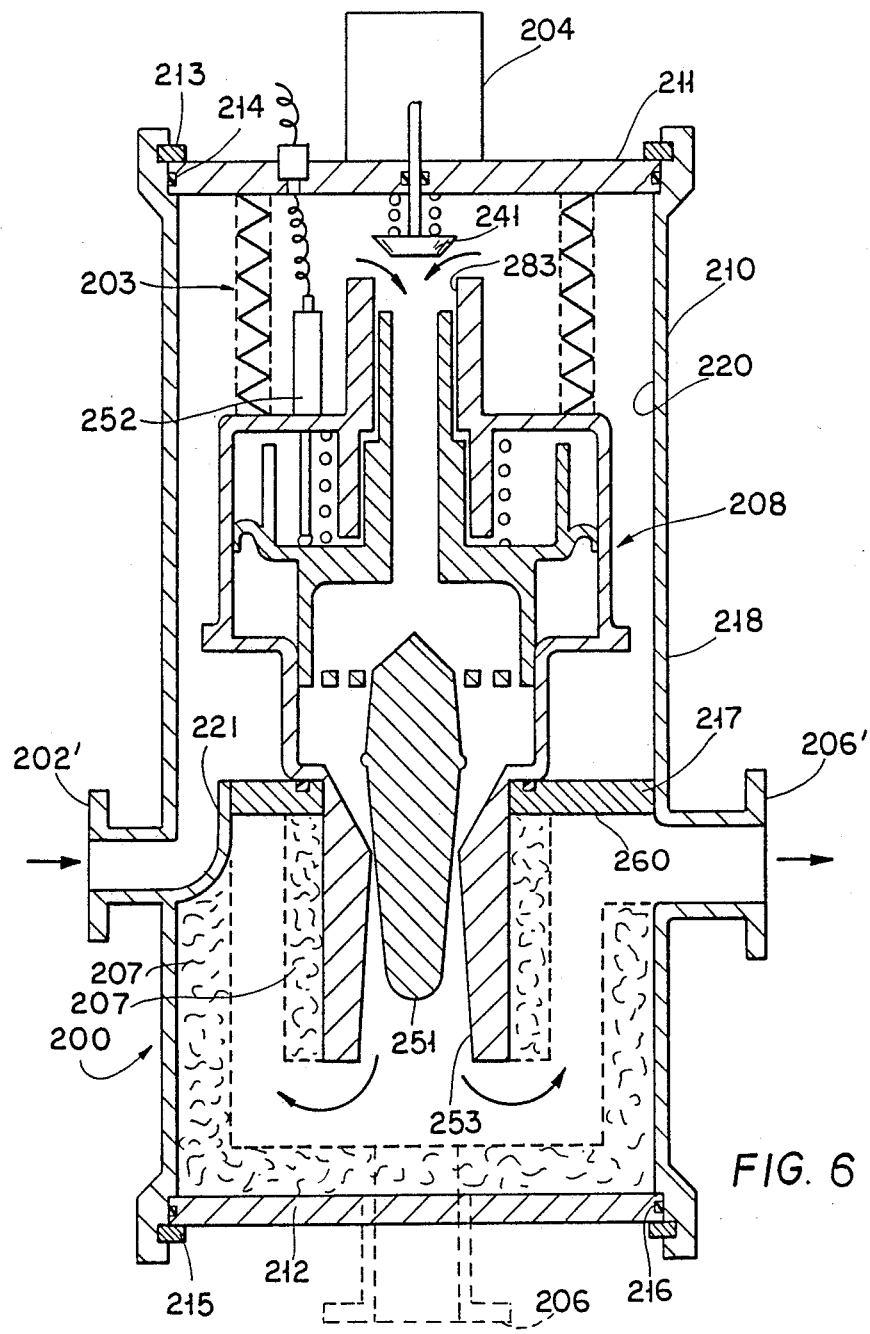
FIG. 6 is an axial cross-sectional view of a variant on the regulating station according to FIG. 5, in which the gas input and output orifices have an inline configuration.

Referring now to FIGS. 5 and 6 there is shown a second embodiment of the present invention differing from the embodiment of FIG. 1 by the fact that the controlled regulator 108, flow director 109 and the flow meter 105 are replaced by an integrated regulator-meter 208 which directly carries out the regulation, pressure adjustment and metering functions simply and accurately. The controlled regulator-meter 208 can, for example, be of the type described in patent FR-A-2 341 131. However the construction of such a regulator-meter 208 is simplified by the fact that it operates under virtually equal pressure and can thus cover the complete range of pressures with only one model, in as much as the operating pressure is borne by the external housing 210. In the integrated regulator station shown in FIGS. 5 and 6 the elements bearing references 202, 203, 204, 206, 206', 207, 210-218, 231, 241, 220, 260, 283 are identical to the corresponding elements of FIG. 1, in which the reference numbers have the same last two Figures. A description of these various elements shall not be repeated.

The regulator-meter 208 includes, as is known in the art, a nozzle having a variable cross-section neck defined by an ogival valve head 251 and a valve seat 253 having convergent and divergent parts. The position of the valve head 251, and hence the passage cross-section of the nozzle's sonic neck is determined by a position sensor 252.

The embodiment of FIG. 6 is similar to that of FIG. 5, differing only in that the input orifice 202' and output orifice 206', shown in full lines, are arranged in line. In this case the input orifice 202' is formed in the body's 210 lateral wall 218 at a level below the separating wall 217, and communicates with the upper chamber 220 by an orifice 221 formed in the separating wall 217. The output orifice 206' is formed in the body's 210 lateral wall 218 and can itself be formed like the output orifices 106' or 206' of FIGS. 1 and 5.

It can thus be noted that it is very easy to provide different possible types of connection, (in line, at right angles, staggered) for the station housing 210 or 110 to joined between the input valve and the output valve.

Whichever type of flange connection is used to join the housing 110 or 210 of the regulator station 100 or 200 to the input valve 2 and output valve 6, it is possible to carry out all necessary interventions on the regulator station without having to remove the housing 110 or 210, but simply by opening one or the other of the bulkheads 111, 112. This greatly simplifies the dismantling and reassembling of these assemblies.

Figure 8:
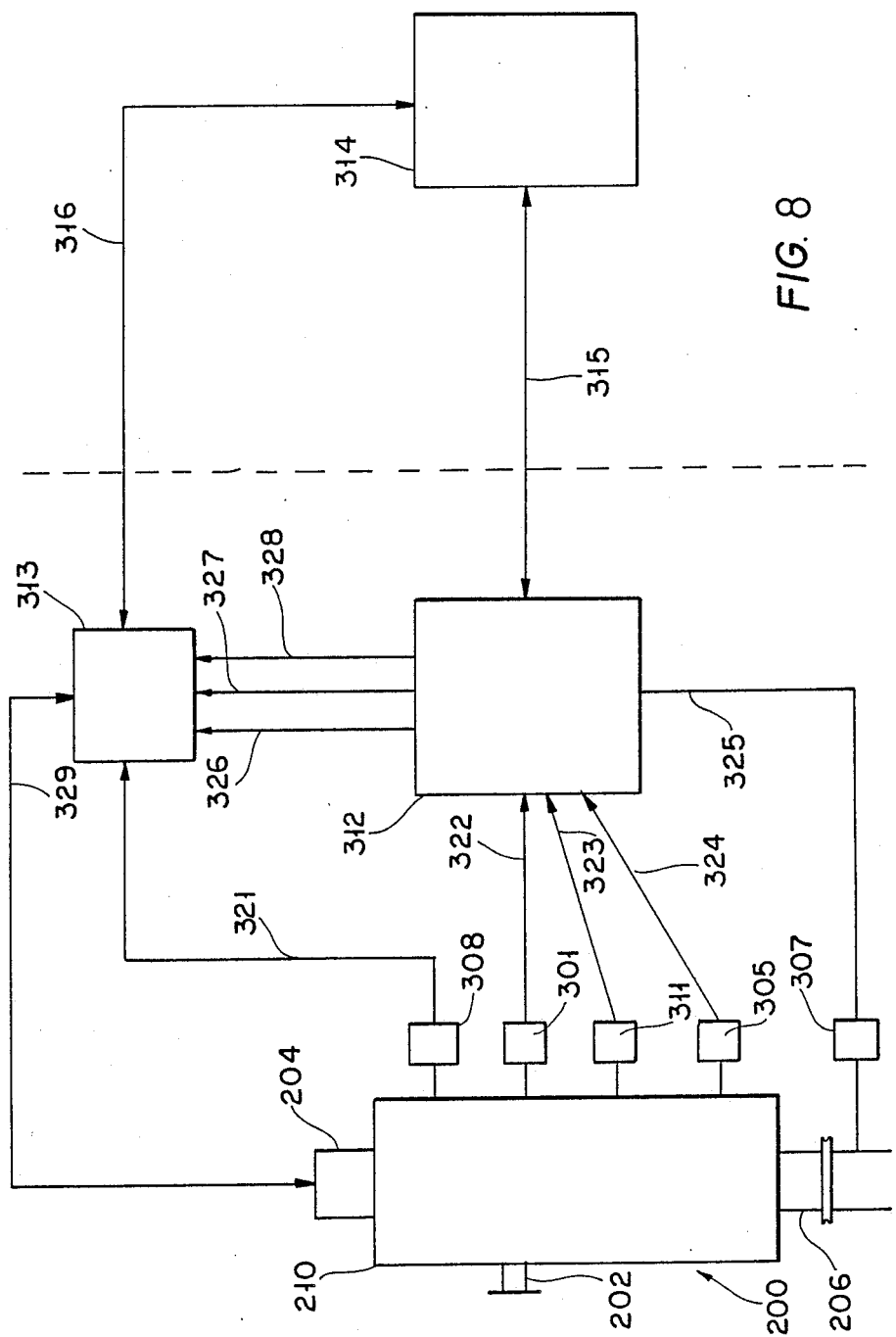
FIG. 8 is a block diagram of an exemplary control system for an integrated multifunction regulator station according to the invention.

An integrated multifunction regulator station of the type shown in FIGS. 5 and 6 which implement a controlled regulator-meter 208 offers advantages not just in the mechanical design, but also in that it grants interesting possibilities for data management and safety control. Thus, in the case of a secondary gas user mains connected to a principal gas distribution mains, and equipped with a set of integrated multifunction regulator stations of the type described with reference to FIGS. 5 and 6, i.e. each using an integrated regulator-meter 208 fitted with various sensors, it is possible, for a meshed-type secondary mains, to generate alarms or selective safety valve actuation commands in each regulator station, based on the set of parameters available at the level of each regulator station. To implement this (see FIG. 8) a processor associated to each regulator station 200, comprises first flow calculating means 312 which receive, via lines 322, 323, 324, 325, data from an upstream pressure sensor 301, a temperature sensor 311 upstream of the gas, a position sensor 305 for the valve head 251 inside the regulator-meter 208 nozzle, and a pressure sensor 307 located downstream in the secondary distribution mains. Second means 313 are provided in the processor for receiving, from the first means 312, data on the downstream pressure (line 326), the valve head 251 position (line 327) and the gas flow rate value calculated by the first means 312 (line 328).

Data from a sensor 308 detecting the presence of an activation pressure is also fed to circuit 313 via line 321. The circuits 313 can then control, via line 329, an action on the safety valve 204 associated to the regulator station 200, if required. The monitoring of various regulator stations within a single secondary mains, each equipped with its own processor comprising circuits such as 312, 313, can be carried out by a central control station 314 associated to the gas mains and connected to processors 312 313 by lines 315 316.

The monitoring of the regulator stations in a gas mains can for example be used to detect leakage flows from any of the regulator stations, such leakage possibly resulting from a bad valve closure due to the presence of foreign bodies, for example. In this case, a joint checking is made of the valve head position (line 327) and hence of the flow along the device (line 328), of whether or not there is an activation signal, i.e. whether there is a regulator activation pressure (line 321) and of the pressure level in the downstream mains (line 326). This check serves to determine a self test procedure for the device, which can lead either to the activation of the safety valve 204, if the leakage flow causes the secondary mains operating pressure to be exceeded, or to the acceptance of this leakage flow if it does not endanger the mains. Naturally, this type of fault will be signalled by an alarm in order to warn that repairs need to be carried out.

Figure 7:
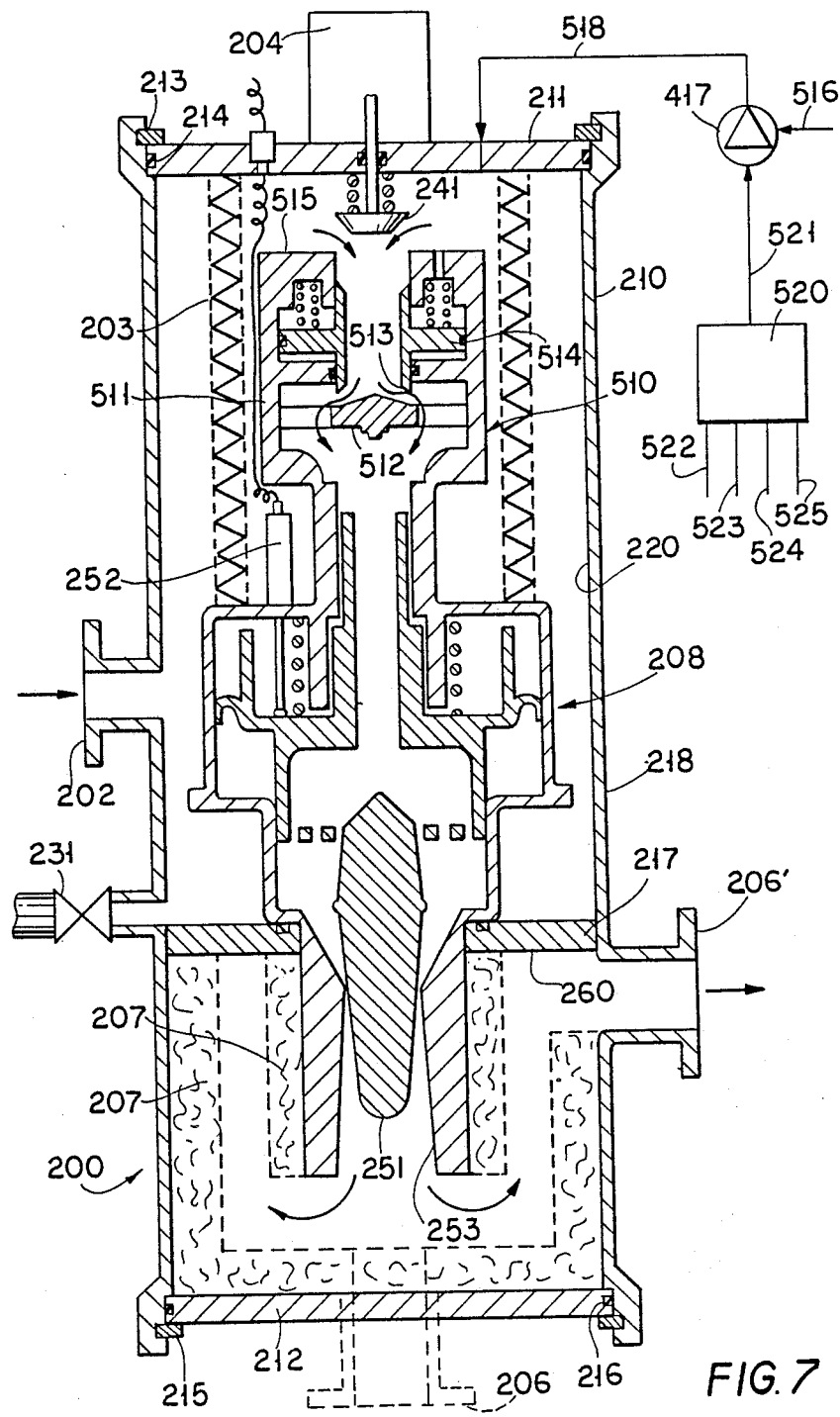
FIG. 7 is an axial cross-sectional view of a regulating station according to the embodiment of FIG. 5, that is also equipped with an actuable device for selectively reducing pressure located upstream of the regulator-meter.

It will be noticed that using the data managed by the processor 312, 313 associated to an integrated regulator station, it becomes simple to evaluate the risks to the secondary mains and thus to define the emergencies for carrying out the necessary repairs, so avoiding systematic activation of safety valves, which could lead to a total interruption of gas distribution in the secondary mains as could be the case when using standard devices. FIG. 7 shows a variant in the embodiments of FIGS. 5 and 6, in which is integrated a device termed "pressure breaker" which allows to increase the dynamic of the regulator-meter as in the embodiment of FIG. 4.

The regulator-meter 208, from the metering point of view is considered like a classical meter located upstream of the pressure regulator. It is thus subject to the pressure variations from the supply mains, with the same consequences on its dynamic as for a classical meter i.e. difficulty in accurately measuring a small flow when the mains pressure is at a maximum.

In the embodiment of FIG. 7, the dynamic of the regulator-meter 208 is increased by the introduction of a device 510 controlled from a flow calculator 520.

The controlled selective pressure reduction device 510 is located in the first chamber 220 inside the cylindrically-shaped filter 203 between the safety valve head 241 and the integrated regulator-meter 208. The flow calculator 520 receives signals corresponding to the integrated regulator-meter 208 operating parameters, and constantly monitors the integrated regulator-meter 208 neck opening cross-section to allow activation of a pneumatic actuator 417 acting on the controlled selective pressure reduction device 510 only when said neck opening cross-section has fallen to below a predetermined threshold value.

The data supplied to the flow calculator 520 by lines 522 to 525 relate to the gas pressure and temperature upstream of the regulator-pressure reducer, the relative positions of elements 251 and 253 defining the variable cross-section neck, determined by a detector 252, and the gas density.

The pneumatic actuator is supplied by a fluid line 516 and, upon receiving a command signal from the calculator 520 via line 521, delivers an activation pressure via line 518 to a chamber inside the body 511 of the device 510 behind a piston 514 biased by springs 515 and having at its downstream end a valve head 513 cooperating with a valve seat 512.

When the regulator-meter 218 operates at a range of valve head 251 openings that allow an accurate flow measurement (eg. between 5 and 100%), the calculator 520 instructs the device 510 to remain open. In this case, the pressure at the nozzle 253 is in the region of the mains pressure.

On the other hand, where the regulator-meter 208 is in a range of openings which does not allow an accurate flow measurement (for example between 0 and 5% opening) the calculator 520 instructs the device 510 via the pneumatic actuator 517 to close until is obtained a pressure drop at the regulator-meter 208 input that will cause the valve head 251 opening to increase. When this increase has reached a value within the 5 to 100% limit, and is thus compatible with the accuracy sought, the system will then set itself to this new equilibrium.

As with the device 410 of FIG. 4, the device 510 will enable the dynamic of the regulating-metering assembly to be considerably increased.

What is claimed is:

1. Integrated multifunction regulator station for gas supply to a secondary user mains running off a principal distribution mains, comprising a single external housing designed so as to withstand an operating pressure and providing accommodation for at least a filter, a pressure regulator and a safety valve, said single external housing having an essentially cylindrical lateral wall, first and second bulkheads mounted on the end portions of the cylindrical wall, a transversal separating and supporting wall lying substantially parallel to the first and second bulkheads and disposed inside the single external body to define first and second chambers, the single external housing being fitted with an entrance flange joined to an input valve and defining an input orifice which leads into said first chamber and an output flange joined to an output valve and defining an output orifice communicating with said second chamber, characterized in that it further comprises a flow meter mounted on said transversal wall, in that said filter is formed by a cylindrical cartridge between the first bulkhead and the pressure regulator, which is itself mounted on said transversal wall, and in that the safety valve is mounted on the first bulkhead and contains a safety valve head located upstream of the pressure regulator, at a top of the latter, and inside the cylindrically shaped cartridge.

2. Regulator station according to claim 1, characterized in that it comprises an actuable regulator located substantially axially inside the external housing within said first chamber, with an output valve head and an output valve seat defining an essentially radial gasout flow, a flow director located immediately downstream of the actuable regulator's output valve head to redirect the gas flow along an axial direction, and a separate flow meter located immediately downstream of the flow director.

3. Regulator station according to claim 2, characterized in that the flow director comprises at least a perforated plate that also serves as a support for the valve seat of the actuable regulator's output valve head, and an element formed of porous material and located immediately downstream of the perforated plate.

4. Regulator station according to claim 3, characterized in that the perforated plate comprises a set of holes whose cross-sections are of the order of 3 to 30 square millimeters and in that the total cross-section of the holes in the perforated plate is equivalent to the flow aperture of the regulator's output valve head in the fully open position so that gas regulation occurs in stages between the regulator's output valve head and the flow director.

5. Regulator station according to claim 4, characterized in that inside the flow regulator the porous material element offers a load loss of the same order as that of the perforated plate.

6. Regulator station according to claim 3, characterized in that the porous material element has a hemispherically-shaped concave output face.

7. Regulator station according to claim 2 characterized in that the flow meter is contained inside a movable cylindrical liner having a standardized external cross-section for engagement inside a support cylinder of the flow meter mounted on said transversal wall.

8. Regulator station according to claim 2 characterized in that it further comprises an actuable device for selectively compensating for a load loss in reaction to the speed of the gas travelling inside the meter in order to increase the meter's dynamic.

9. Regulator station according to claim 8, characterized in that it includes an electronic correction device to which are applied data signals respectively supplied by a flow detector associated to the flow meter, a pressure sensor in the second chamber and a temperature sensor in the second chamber, in that the electronic correction device contains means for determining the true flow corrected in function of the measured gas flow, pressure, temperature and compressibility, means for comparing the said true corrected flow with a stored threshold value corresponding to a maximum allowed flow for the meter, and means for only authorizing the activation of a pneumatic actuator, for selectively compensating for a load loss, when the true corrected flow rate exceeds the maximum stored threshold value.

10. Regulator station according to claim 8, characterized in that it includes a differential pneumatic device that continuously measures the meter's natural load loss, compares it with a reference load loss corresponding to the maximum allowed flow, and activates the actuable device for selectively compensating for a load loss when the measured load loss exceeds the reference load loss.

11. Regulator station according to claim 1, characterized in that it includes an integrated regulator-meter at reference pressure and fitted with a nozzle defining, with an ogival valve head, a variable cross-section neck in which the flow is parallel to the axis of the single housing.

12. Regulator station according to claim 11, characterized in that it further includes an actuable device for selectively reducing pressure, located in the first chamber, inside the cylindrical shaped filter, between the safety valve head and the integrated regulator-meter, in order to increase the dynamic of the latter.

13. Regulator station according to claim 12, characterized in that it includes a flow calculator into which are fed signals corresponding to the operating parameters of the integrated regulator-meter and which continuously monitors the neck opening of the integrated regulator-meter so as to only allow the activation of a pneumatic control device, acting on the actuable device for selective pressure reduction, when the neck opening has fallen below a predetermined threshold value.

14. Regulator station according to claim 11, characterized in that it includes at least one sensor for the activating pressure of the regulator-meter, an upstream gas pressure sensor, an upstream gas temperature sensor, and a sensor determining the relative position of elements defining the nozzle having a variable cross-section neck, and a calculator, and in that the calculator comprises on the one hand means for determining the gas flow through the integrated regulator-meter on the basis of data supplied by the upstream pressure sensor, upstream temperature sensor and sensor determining the relative position of elements defining the nozzle having a variable cross-section neck, and on the other hand second means controlling the activation of the safety valve as a function of the flow value calculated by the first means, and data supplied by the downstream pressure sensor and activating pressure sensor.

15. Regulator station according to claim 1, characterized in that the output orifice is formed in the second bulkhead to define an output orifice that is at right angles with respect to the input orifice.

16. Regulator station according to claim 1, characterized in that the output orifice is formed in the lateral wall of the single housing while positioned in line with the input orifice.

* * * * *